April 3, 1951 R. H. CAMPBELL 2,547,855
COMMUNICATION APPARATUS
Filed May 7, 1948
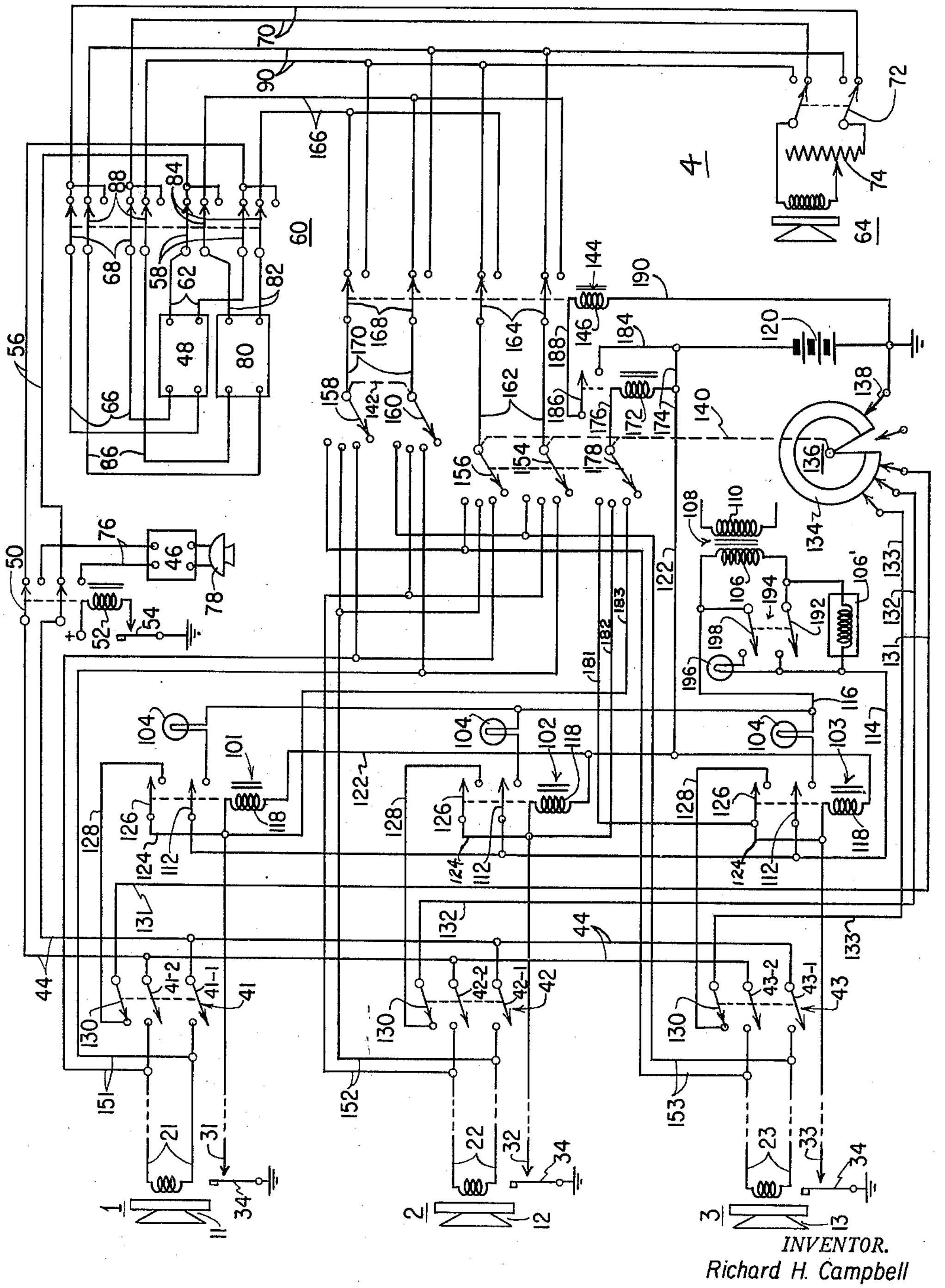
INVENTOR.
Richard H. Campbell
BY
Mason, Kolehmainen, Rathburn & Wyss
Attys Patented Apr. 3, 1951

2,547,855

UNITED STATES PATENT OFFICE 2,547,855

COMMUNICATION APPARATUS

Richard H. Campbell, Racine, Wis., assignor to Webster Electric Company, Racine, Wis., a corporation of Delaware Application May 7, 1948, Serial No. 25,752

21 Claims. (Cl. 179—40)

The present invention relates to communication apparatus and particularly to intercommunicating apparatus of the loud-speaking type.

One of the primary objects of the present invention is to provide a new and improved communication apparatus comprising a central station and a plurality of remote or substations wherein communication can be carried on between the remote stations through means including amplifying means located at the central station.

A further object of the present invention is to provide a new and improved communication system comprising a central station and a plurality of remote stations wherein communication can be carried on between the central station and selected remote stations through a selected one of a plurality of amplifying means at the central station.

Another object of the present invention is to provide a new and improved communication system comprising a central station and a plurality of remote stations wherein communication can be carried on between remote stations through the central station under the control of one of the remote stations.

A further object of the present invention is to provide new and improved communication apparatus and signaling arrangements for systems of the character set forth above.

A still further object of the present invention is to provide a new and improved communication system including central and remote stations wherein signaling circuits and means are utilized for other purposes, such as controlling communication, thereby to reduce the number of component parts and expense.

Other objects and advantages of the present invention will become apparent from the ensuing description of an embodiment thereof, in the course of which reference is had to the accompanying drawings, the single figure of which is a diagrammatic representation of communication apparatus embodying the invention.

The invention is applicable to systems comprising a number of stations, although but four have been illustrated in the figure. The illustrated stations include three remote stations 1, 2 and 3 and a central station 4, at which most of the equipment is located. It should be understood, however, that the number of stations may be changed as desired.

The remote stations include translating devices 11, 12 and 13 having their voice coils connected to associated interstation communication circuits 21, 22 and 23, respectively. The remote stations are also connected to the central station by the signaling circuits 31, 32 and 33, each of which includes a switch 34 utilized both for signaling and communication direction control, as will be described in greater detail hereinafter. The switch is normally open, to which position it may be biased by a spring, not shown, and one terminal is grounded, as readily apparent from the figure.

The central station includes control switches and circuits enabling (1) the remote stations to signal the central station, (2) the central station to be placed in two-way communication with selected remote stations, the direction of communication being under the control of the central station, (3) the central station to call any desired remote station and have two-way communication with it, and (4) the central station to establish communication circuits between selected remote stations and preferably so that the direction of communication is under the control of one of the remote stations between which communication is established. The central station includes a plurality of amplifying means and controls enabling the interchange of functions performed by the amplifying means so that should it be desirable, for instance, as the result of failure of one amplifier, to substitute another, this can be done.

Communication may be established between the central station and the remote stations through station selector switches 41, 42 and 43 individual, respectively, to stations 1, 2 and 3. When any of these switches is closed, the corresponding interstation communication circuit 21, 22 or 23 is connected to a central station two-way communication circuit 44 by two lowermost switch blades of the respective station selector switches, which are indicated by the suffixes 1 and 2 after the station selector switch reference character.

Two-way communication between the central station and selected remote station or stations is carried on through a transmission amplifier 46 and a reception amplifier 48, under the control of the operator at the central station. The communication circuit 44 is normally connected to the input of the amplifier 48 through a switch 50 operable into a second position to connect the circuit 44 to the output of the transmission amplifier 46. The switch 50 is operable by a relay 52 adapted to be connected to a suitable source of power, not shown, by the closure of a switch 54. When thus connected to the source of power, the switch 50 is operated from its indicated or reception position to a second or transmission position.

In the indicated reception position of the switch, the communication circuit 44 (and the selected interstation circuit) is connected to the input of amplifier 48 through a reception circuit 56, the two switch blades 58 of a selectively operable change-over switch, indicated in its entirety by reference character 60, and the input connections 62. The output of the amplifier is connected to a translating device, which may be a loudspeaker 64 through the output connections 66, switch blades 68 of switch 60, circuit 70 a selector switch 72, the purpose of which will be described further hereinafter, and a volume controlling potentiometer 74 adjustably connected to the voice coil of loud-speaker 64.

In the transmission position of switch 50, the circuit 44 is connected to the output connections 76 of amplifier 46, to the input of which is connected, preferably permanently, a transmitting means which may be a microphone 78.

Reviewing the mode of communication between the central and remote stations, it may be noted that this is done under the control of the switch 54 and subsequent to establishment of a circuit to the selected remote station or stations through the closure of switches 41, 42 or 43.

In the event amplifier 48 should fail or should it be desired not to use it for any reason whatever, another amplifier 80 can be substituted for it in the reception circuit. Before describing how this is done, it may be well to note that the amplifier 80 is normally used for communication between selected remote stations in a manner to be described in detail hereinafter. When, however, amplifier 80 is used for reception in the same manner as amplifier 48, its input connections 82 are connected to the reception circuit 56 through switch blades 84 of switch 60 and its output connections 86 are connected to the loud-speaker 64 through switch blades 88 of switch 60, circuit 90, switch 72 in the second of its two positions, and potentiometer 74.

The above-described mode of communication between the central and remote stations obtains whenever the station selector switches for the remote stations are operated. These switches are operated by the operator at the central station either when he desires to call a remote station or in response to a signal or other indication from the remote station that the latter desires to communicate with the central station. In the illustrated embodiment of the invention, the arrangement is such that the remote station can signal the central station of its desire to communicate with the central station. The signal is given at the central station upon closure of switch 34, which closure may be momentary in nature. Once the switch is closed, a relay 101, 102, or 103, corresponding to stations 1, 2, or 3, is operated and locked in operated position through a locking circuit to be described shortly. When the relay operates, a pilot lamp 104 individual to the station is lighted and a buzzer 106′, common to all the stations, sounds. The light 104 is connected across a suitable source of power which may be the secondary winding 106 of a transformer 108, the primary winding 110 of which may be connected to a suitable source of power, not shown. The connection of the pilot light to the secondary winding is effected by a relay operated switch 112 and a circuit including conductors 114 and 116. The buzzer 106′ is in series with conductor 116 so that its circuit is also closed or completed when the switch 112 is closed.

The signaling arrangement is such that even momentary closure of a switch 34 locks the relay corresponding to the particular station or stations at which the signaling switch is closed. When a switch 34 is closed, the relay winding 118 is connected across a suitable source of power which may be the battery 120 at the central station through a ground connection, the interstation signal circuit 31, 32, or 33, and conductor 122, which is connected to and common to all the relay windings and leads to the battery. The relay is locked in operated position through a locking circuit including conductor 124 (here, again, like reference characters are applied to like parts associated with the relays and their respective locking circuits), switch blade 126 operable by the relay to complete the locking circuit, conductor 128, switch blade 130 operable simultaneously with the selector switch and conductors 131, 132 and 133, individual to stations 1, 2 and 3, respectively, and interrupted circular contact 134 of a locking circuit control switch 136, the purpose of which will be described more fully hereinafter, and ground conductor 138. The ground conductor and thus the locking circuit is normally connected to the contact 134 common to the various locking circuits so that the relay locking circuits are completed whenever the relays are operated. However, the contact 134 is interrupted so that when the switch 136 is operated, as it is upon establishment of communication between selected remote stations, the relay 101, 102, or 103 at one of the selected stations and the switch 34 at that station may be used for controlling communication between the selected remote stations.

When the call from a remote station is noted, the selector switch corresponding to that station is closed, whereupon the switch 130 opens the locking circuit and the corresponding relay 101, 102, or 103 is returned to its normal position. When the communication circuit has been completed, communication can be carried on between the central station and the selected remote station in the manner described above in connection with the initiation of a call at the central station. Certain features of the above described portion of the system are disclosed and claimed in my co-pending application Serial No. 6,608, filed February 6, 1948.

One of the important features of the present invention resides in the provisions made for placing two of the remote stations in communication with each other and preferably with the direction of communication controlled by the operator at one station, preferably the calling station. A further feature resides in the use of the signaling switch 34 for the purpose of controlling the direction of communication.

When one of the remote stations desires to communicate with another, the station calls the central station in the manner described above. The central station answers the call and when informed of the desire of the calling remote station to call a called remote station, the central station operator establishes the necessary circuits. In describing these circuits, it is assumed that station 3 desires to communicate with station 1. The operator at station 3 calls the central station as already described. The central station operator then calls station 1 in a manner also already described. When the arrangements have been made with operators at stations 1 and 3, the selector switches 41 and 43 corresponding to the two stations which are closed for communication between the remote stations and the central station are opened and other selectively operable switches at the central station are operated to establish the necessary communication and control circuits. These selectively operable switches at the central station include a multipole switch, indicated as a whole by reference character 140, and another multipole switch, indicated as a whole by reference character 142. The switch 140 is operated to a position corresponding to the calling station, in this case station 3, and the switch 142 is operated to a position corresponding to the called station, station 1. When these switches are operated as indicated, the loud-speakers 11 and 13 at stations 1 and 3 are connected through communication circuits to be described, the switches 140 and 142, and selectively by a communication direction control switch 144 to the input or output of amplifier 80. The switch 144 normally connects the calling station to the output and the called station to the input of the amplifier. When it is desired to reverse the direction of communication, the calling station operates switch 34, thereby to energize a relay winding 146 operating switch 144 to move the latter to its other position and thereby reverse the connections to the amplifier.

The communication between selected remote stations is carried on through their respective interstation communication circuits 21, 22, 23, which are connected at the central station by circuits 151, 152 and 153, respectively, to contacts individual to the remote stations and engageable by the movable switch blades 154 and 156 of switch 140 and switch blades 158 and 160 of switch 142. As illustrated, there are three contacts associated with each switch blade and these correspond to stations 1, 2 and 3, respectively, starting from the lowermost contact.

Switch 140 is, as already indicated, operated to a position corresponding to the calling station, i. e., station 3. It connects station 3 to the output of amplifier 80 through the circuit 162, switch blades 164 of switch 144, circuit 90, switch blades 88, and conductor 86. The input of the amplifier 80 is connected to station 1, the called station, through conductor 82, switch blades 84 of switch 60, circuit 166, switch blades 168 of switch 144, and circuit 170, the two conductors of which are connected to switch blades 158 and 160. The communication circuit is thus conditioned for communication from station 3 to station 1.

To reverse the direction of communication, the operator at station 3 closes switch 34. This results in the connection of winding 146 to the battery and in the operation of switch 144 to reverse the connections of circuits 162 and 170 to the amplifier so that station 3 is connected to the input and station 1 to the output. The closure of switch 34 effects energization of a relay winding 172 by connection thereof across the battery. One end of the winding is connected directly to the battery through conductor 174. The other end is connected to the battery through the ground circuit and the circuit including conductor 176, a switch blade 178 movable simultaneously with switch blades 156 and 154 which, when station 3 is the calling station, is in engagement with its uppermost associated contact, conductor 181, conductor 33, and switch 34. It will thus be noted that winding 172 is, in effect, connected in parallel with winding 118 of relay 103 corresponding to station 3. The result would be the locking of relay 103 in operated position, but this is prevented by the switch 136 which breaks the locking circuit for the relay when the switch 140, of which switch 136 also forms a part, is moved into the proper position for station 3. In other positions of switch 140, circuits are completed through conductors 182 and 183 to the interstation circuits 31 and 32 of stations 1 and 2.

When the winding 172 is energized by closure of switch 34 at station 3, an energizing circuit is completed for winding 144. This energizing circuit extends from the battery through conductor 174, conductor 184, switch 186 operated by the winding 172, conductor 188, and the ground return conductor 190.

It should perhaps be noted that while it is preferred that switch 140 be operated to a position corresponding to the calling station, it could be operated to a position corresponding to the called station. In this event, the called station would, however, have to control the direction of communication because the locking circuit for its associated relay is broken by the switch 136.

The operator at the central station is given an indication that the remote stations are communicating with each other by the intermittent flashing of the light 104 corresponding to the calling station and by operation of the buzzer 106. However, the latter can be short circuited by the switch blade 192 of a switch 194 adapted to short circuit the buzzer when the switch is closed. To indicate the short circuiting of the buzzer, there is provided a light 196 which is energized through a circuit including the switch blade 198 whenever the switch 194 is closed.

The operation of the system as a whole will now be reviewed. It will be assumed first that the central station desires to communicate with one of the remote stations, says, station 1. Station 1 is selected by closure of station selector switch 41. The switch 54 is closed to operate switch 50 to its transmission position. The output of the transmission amplifier 46 is thus connected to loud-speaker 11 at station 1. Consequently, the central station can call the operator at station 1. To receive from station 1, the switch 54 is opened and switch 50 returns to its indicated position wherein loud-speaker 11 is connected to the input of amplifier 48 and the output of the latter is connected to loud-speaker 64, as previously described.

When the central station and remote station 1 are communicating, other stations can call the central station. For example, station 3 can do so by closure of switch 34 thereat. The result is the operation of relay 103, which effects lighting of lamp 104, the operation of buzzer 106', and which also locks itself in through the locking circuit including switch 130 of the selector switch 43 and the switch 136. As soon as the central station is through talking with station 1, the selector switch 41 is opened and the selector switch 43 is closed. The central station can then talk to the remote station. If it is discovered that station 3 desires to communicate with station 1, then the central station can call station 1, as before, either before or after opening the selector switch 43 for station 3.

The central station can establish a communication circuit between the calling station and the called station 1. This is done by operating switch 140 to engage its uppermost contact and operating switch 142 to engage its lowermost effective contact. This connects station 3 to the output of amplifier 80 and station 1 to the input. To reverse the connections of the stations to establish communication in the opposite direction, switch 34 at station 3 is closed. This effects energizing of winding 146 and operation of the switch 144 to its other position. The operation of switch 34 does not effect the locking in of relay 103 because the locking circuit for the latter is broken by switch 136.

The flashing of light 104 responsive to operation of switch 34 indicates that stations 1 and 3 are in communication with each other. This is also indicated by the buzzer 106′ which, however, can be shorted by switch 194. When the buzzer is shorted, light 196 is also energized thereby to provide an additional indication that remote stations are or have been in communication with each other and that the buzzer has been shorted.

While stations 1 and 3 are in communication with each other, other remote stations, such as station 2, can call the central station. The call will be indicated by the lighting of pilot lamp 104 and the locking in of relay 102 just as when station 3 called station 1. The relay will be locked in because the locking circuit for relay 102, which includes conductor 132, is completed through switch 136. The central station can communicate with station 2 while stations 1 and 3 are communicating with each ther. The communication is carried on through the translation amplifier 46 and the reception amplifier 48 in a manner already described.

The central station can also monitor the communication between stations 1 and 3. To do this the switch 72 is moved to its other position wherein it is connected to conductor 90 which is connected to the output of amplifier 80.

After the completion of a call between remote stations, the switches 140 and 142 are returned to their indicated normal positions.

Should amplifier 48 fail or should it not be desired to use it for any reason, the amplifier 80 can be substituted for it by operation of switch 60 to its second position, which is one position below its indicated position. This also effects the change-over of amplifier 48 for use in communication between remote stations. If amplifier 80 is used as a reception amplifier, then switch 72 is moved to its other position to connect it to the output of the amplifier through circuit 90.

While the present invention has been described in connection with the details of a single embodiment thereof, it should be understood that these details are not intended to be limitative of the invention except in so far as set forth in the accompanying claims. The illustrated system may include more stations than indicated, and, if desired, the central station may be provided with a number of amplifiers corresponding to amplifier 80 so that communication can be carried on simultaneously between more than two sets of stations.

Having thus described my invention, what I claim as new and desire to secure by Letters Patent of the United States is:

1. Communication apparatus including, a first station having a translating device utilizable both as a receiver and a transmitter, a second station including transmission amplifying means, transmitting means connected to said transmission amplifying means, a pair of reception amplifying means, reception means, selectively operable means for connecting said reception means to the output of one of said reception amplifying means, an interstation circuit interconnecting said stations, and selectively operable switch means connected to said circuit operable selectively to connect said circuit to said transmission amplifying means or to the input of the reception amplifying means to the output of which said reception means is connected.

2. Communication apparatus including a communication circuit, a transmission circuit, amplifying means having its output connected to said transmission circuit, transmitting means connected to the input of the amplifying means, a reception circuit, a pair of amplifying means, reception means, means including first selectively operable means associated with said communication, reception and transmission circuits for selectively connecting said communication circuit to said reception or transmission circuits, and means including second selectively operable means associated with said reception circuit, amplifying means and reception means for connecting said reception circuit and reception means to the input and output, respectively, of one or the other of said pair of amplifying means.

3. A communication system including a plurality of remote stations, a central station including a plurality of amplifying means, a first communication circuit between each of said remote stations and the central station, means including station selector switches at the central station for selectively connecting said communication circuits to one of said amplifying means for effecting communication between said central and remote stations, a second communication circuit between each of said remote stations and said central station, and means including selectively operable switches at the central station for connecting said second communication circuits to another of said amplifying means for effecting communication between said remote stations.

4. A communication system including a plurality of remote stations, a central station including a plurality of amplifying means, a first communication circuit between each of said remote stations and the central station, means including station selector switches at the central station for selectively connecting said communication circuits to one of said amplifying means for effecting communication between said central and remote stations, a second communication circuit between each of said remote stations and said central station, means including selectively operable switches at the central station for connecting said second communication circuits to another of said amplifying means for effecting communication between said remote stations, and means including selectively operable switches associated with the amplifying means for reversing the positions of said amplifying means in said first and second communication circuits.

5. A communication system including a plurality of remote stations, a central station including a plurality of amplifying means, a first communication circuit between each of said remote stations and the central station, means including station selector switches at the central station for selectively connecting said communication circuits to one of said amplifying means for effecting communication between said central and remote stations, a second communication circuit between each of said remote stations and said central station, means including selectively operable switches at the central station for connecting said second communication circuits to the other of said amplifying means, other selectively operable switches at said central station for reversing the connections of said second communication circuits to said other amplifying means, and control means at one of said remote stations for controlling said other selectively operable switches for effecting communication between said remote stations.

6. Communication apparatus including a first station, a second station, a signaling circuit between said stations, a communication circuit between said stations, signaling switch means at the first station operable to a predetermined position to change the condition of said signaling circuit, relay means at the second station connected to said signaling circuit and operable in response to said change in condition of said circuit, means controlled by said relay means and operable thereby for maintaining said relay means in operated condition subsequent to operation of said switch means at said first station from its said predetermined position, station selector switch means at said second station associated with said communication circuit including switch means controlling said relay means operable from a first to a second position for returning said relay means to a nonoperated condition, and a selectively operable switch at said second station in circuit with said station selector switch means in its first position.

7. Communication apparatus including a first station, a second station, a normally open signaling circuit between said stations, a normally open communication circuit between said stations, a switch at the first station closable to complete said signaling circuit, a relay at the second station in said signaling circuit energizable upon completion of said circuit, a relay locking circuit and a switch therein operable by said relay for maintaining said relay operated subsequent to opening of said switch at said first station, a station selector switch at said second station operable to complete said communication circuit and including a normally closed switch in circuit with said relay operated locking circuit switch operable with said station selector switch to open the relay circuit and deenergize the relay, and a selectively operable switch at said second station in said locking circuit adapted to complete said circuit in one position.

8. Communication apparatus including, a signaling circuit, a communication circuit, relay means connected to said signaling circuit and operable in response to a momentary change in condition of said circuit, means controlled by said relay means and operable thereby for locking said relay means in operated condition, station selector switch means in said communication circuit controlling said relay and operable to a predetermined position for returning said relay means to a nonoperated condition, and other selectively operable switch means operatively connected with said station selector switch means and locking means for rendering said locking means ineffective.

9. Communication apparatus including a signaling circuit, a communication circuit, a relay in said signaling circuit energizable upon momentary completion of said circuit, a signal device, an energizing circuit and a switch in said circuit for energizing said device upon said operation of said relay, a locking circuit and a switch therein operable by said relay for maintaining said relay operated, a station selector switch operable to close said communication circuit, a normally closed switch in circuit with said locking circuit switch controlling said relay and thereby said signal device and operable with said selector switch for opening the relay circuit and deenergizing the relay, and a selectively operable switch in said locking circuit operable to open said locking circuit.

10. Communication apparatus including a plurality of first stations, a second station, normally open signaling and communication circuits between said second station and each of said first stations, a switch at each of said first stations closable to complete its associated signaling circuit, a relay at the second station in the signaling circuit for each of said first stations and energizable upon completion of its associated signaling circuit, a relay locking circuit for each of said relays including a switch in said circuit operable by the relay for maintaining said relay operated subsequent to opening of the switch at said first stations, station selector switches at said second station for each of said first stations operable to complete associated communication circuits and each including a normally closed switch in the locking circuit for the relay associated with the station corresponding to the selector switch, and manually operable switch means normally closing the locking circuits for all said relays and operable to open the locking circuit of a selected relay.

11. Communication apparatus including a plurality of signaling circuits, a plurality of communication circuits, relay means in each of said signaling circuits operable upon momentary completion of its associated signaling circuit, means controlled by each of said relay means for locking said relay means in operated condition, station selector switch means connected with each of said communication circuits including means controlling the associated relay means and operable to a predetermined position for returning said relay means to a nonoperated condition, and selectively operable means for rendered a selected one of said locking circuits ineffective.

12. Communication apparatus including a plurality of circuits, relay means in each of said circuits operable upon momentary completion of its associated circuit, means controlled by each of said relay means for locking it in operated condition, means connected with each of said circuits for unlocking a locked relay means, and means operatively connected with all said circuits for selectively rendering any one of said locking means ineffective.

13. Communication apparatus including a central station, a pair of remote stations each having voice receiving and transmitting means, amplifying means at the central station having an input and an output, means at the central station including selectively operable switch means for selectively connecting said voice receiving and transmitting means to the input and output of said amplifying means and electromagnetic means for operating said selectively operable means, and means including a control circuit leading to one of said remote stations and selectively operable means in said circuit at said one station controlling said electromagnetic means for effecting two-way communication between said remote stations.

14. A communication system including a central station and a plurality of remote stations, a communication circuit between each of said remote stations and the central station, selectively operable means at the central station and circuits controlled thereby for establishing communication circuits between selected remote stations, controllable communication direction control means at the central station in the established communication circuits, and a control circuit for said controllable communication direction control means including a switch at one of said remote stations for which the communication circuits are established.

15. Communication apparatus including a central station, a pair of remote stations each having voice receiving and transmitting means, amplifying means at the first station having an input and an output, means at the central station including selectively operable switch means for selectively connecting said voice receiving and transmitting means to the input and output of said amplifying means and electromagnetic means for operating said selectively operable means, and means including a control circuit leading to one of said remote stations and selectively operable means in said circuit at said one station controlling said electromagnetic means for effecting two-way communication between said remote stations, second amplifying means at said central station, and means including selectively operable switch means and circuits controlled thereby for substituting said second amplifying means in place of said first amplifying means.

16. A communication system including a plurality of remote stations, a central station including amplifying means, a communication circuit between each of said remote stations and the central station, selectively operable switch means at the central station for connecting said communication circuits to said amplifying means, selectively operable second switch means at the central station for reversibly connecting said communication circuits to the input and output of said amplifying means, and means including control means at one of said remote stations and operating means for said second switch means at the central station controlled thereby for reversing the connections of said circuits to said amplifying means.

17. A communication system including a plurality of remote stations, a central station including amplifying means and two amplifier communication circuits, selectively operable switch means at the central station for reversibly connecting said amplifier communication circuits to the input and output of said amplifying means, an interstation communication circuit between each of said remote stations and the central station, selector switches connected to each of said amplifier communication circuits, branch communication circuits leading from each of said interstation communication circuits to said selector switches whereby said interstation circuits are selectively connectable to said amplifier communication circuits, and means including control means at one of said remote stations and operating means for said second switch means at the central station controlled thereby for reversing the connections of said circuits to said amplifying means.

18. A communication system including a plurality of remote stations, a central station including amplifying means and two amplifier communication circuits, selectively operable switch means at the central station for reversibly connecting said amplifier communication circuits to the input and output of said amplifying means, an interstation communication circuit between each of said remote stations and the central station, selector switches connected to each of said amplifier communication circuits, and branch communication circuits leading from each of said interstation communication circuits to said selector switches whereby said interstation circuits are selectively connectable to said amplifier communication circuits.

19. A communication system including a central station and a plurality of remote stations, a signaling circuit between each of said remote stations and the central station, a communication circuit between each of said remote stations and the central station, means including a signaling switch at each remote station in its associated signaling circuit for signaling the central station from the remote station, selectively operable means at the central station and circuit controlled thereby for establishing communication circuits between selected remote stations, controllable communication direction control means at the central station in the established communication circuits, and a control circuit for said controllable communication direction control means including the signaling switch at one of said remote stations for which the communication circuits are established.

20. A communication system including a plurality of remote stations, a central station including a plurality of amplifying means, a first communication circuit between each of said remote stations and the central station, a signaling circuit between each of said remote stations and the central station, a signaling switch in each of said circuits located at the remote stations, signal means at the central station corresponding to each remote station, relay means at the central station operable upon closure of a signaling switch for operating the signal means, means operable by said relays for locking the relays in operated position, means including station selector switches at the central station adapted selectively to connect said communication circuits to one of said amplifying means for effecting communication between said central and remote stations, means operable by said selector switches for unlocking said relays, a second communication circuit between each of said remote stations and said central station, means including a pair of selectively operable switches at the central station for connecting the second communication circuits corresponding to calling and called remote stations, respectively, to the other of said amplifying means, other selectively operable switches and a relay operating said switches at said central station for reversing the connections of said second communication circuits to said other amplifying means, and the signaling switch at one of said remote stations for controlling said relay operating said other selectively operable switches for effecting communication between said remote stations, said central station including also switch means operable simultaneously with the one of said pair of switches corresponding to the calling station for opening the locking circuit of the relay means corresponding to the calling station upon closure of the signaling switch at the calling remote station.

21. A communication system including a central station and a plurality of remote stations, signaling and communication circuits at the remote stations, a signal switch at each remote station in its signaling circuit, signal control means at the central station for each remote station comprising a relay and a relay locking circuit closed upon operation of the relay, relay control means at the central station operable to unlock said relay upon establishment of communication between the central and remote stations, means at the central station for establishing communication between selected remote stations, means including the signal switch at one of said remote stations and the corresponding signal circuit for controlling the direction of communication between said selected remote stations, and means at the central station comprising a switch in said locking circuit operable upon establishment of said communication circuit for preventing locking of the relay controlled by the signal switch.

RICHARD H. CAMPBELL.

REFERENCES CITED

The following references are of record in the file of this patent:

UNITED STATES PATENTS

| Number | Name | Date |
|---|---|---|
| 1,802,675 | Sisty et al. | Apr. 28, 1931 |
| 2,099,442 | Howell | Nov. 16, 1937 |
| 2,162,369 | Campbell | June 13, 1939 |
| 2,162,370 | Campbell | June 13, 1939 |
| 2,162,371 | Campbell | June 13, 1939 |
| 2,162,372 | Campbell | June 13, 1939 |
| 2,162,547 | Campbell | June 13, 1939 |
| 2,249,456 | Campbell | July 15, 1941 |
| 2,269,141 | Campbell | Jan. 6, 1942 |
| 2,269,142 | Campbell | Jan. 6, 1942 |
| 2,269,143 | Campbell | Jan. 6, 1942 |
| 2,275,405 | Berkley | Mar. 10, 1942 |
| 2,280,280 | Campbell | Apr. 21, 1942 |
| 2,317,358 | Campbell | Apr. 27, 1943 |
| 2,323,307 | Campbell | July 6, 1943 |
| 2,347,079 | Campbell | Apr. 18, 1944 |
| 2,347,080 | Campbell | Apr. 18, 1944 |
| 2,377,672 | Campbell | June 5, 1945 |